United States Patent [19]

Mayo et al.

[11] Patent Number: 5,120,252

[45] Date of Patent: Jun. 9, 1992

[54] METHOD OF MOUNTING DISK SENSING OPTICS ONTO CIRCUIT BOARD OF WATTHOUR METER

[75] Inventors: Robert C. Mayo, Kennebunkport, Me.; Andrius A. Keturakis, Portsmouth; Scott D. Velte, Rochester, both of N.H.

[73] Assignee: General Electric Company, Somersworth, N.H.

[21] Appl. No.: 701,729

[22] Filed: May 17, 1991

Related U.S. Application Data

[62] Division of Ser. No. 505,383, Apr. 5, 1990, Pat. No. 5,034,682.

[51] Int. Cl.5 .................. H05K 13/04; H05K 3/32
[52] U.S. Cl. ........................ 445/22; 29/837; 228/180.1
[58] Field of Search .......... 228/180.1; 29/837, 838, 29/839; 324/142, 157; 445/1, 22

[56] References Cited

U.S. PATENT DOCUMENTS

| | | | |
|---|---|---|---|
| 4,713,610 | 12/1987 | Willis | 324/157 |
| 4,783,623 | 11/1988 | Edwards et al. | 324/157 X |
| 4,791,362 | 12/1988 | Philpot | 324/157 X |
| 4,953,061 | 8/1990 | Nitkiewicz | 29/837 X |
| 4,977,368 | 12/1990 | Munday | 324/157 X |
| 5,066,906 | 11/1991 | Moore | 324/157 X |

Primary Examiner—Kenneth J. Ramsey
Attorney, Agent, or Firm—John S. Beulick

[57] ABSTRACT

A disk sensing optics assembly is mounted directly on the register circuit board of an electronic energy meter. The molded optics assembly includes an central cavity adatped to receive a discontinuous rotating shutter, and pockets on either side dimensioned to hold and position pairs of light emitters and detectors on opposite sides of the shutter to detect speed and direction of rotation of the shutter. Apertures through the rear of the housing are adapted to position and secure the electrical leads from the light emitters and detectors within the housing and are soldered to the register printed circuit board. Positioning means integral with the housing and register circuit board space, position, and secure the disk sensing optics and the assembly to the register circuit board with the electrical leads properly positioned for soldering to the circuit board.

26 Claims, 3 Drawing Sheets

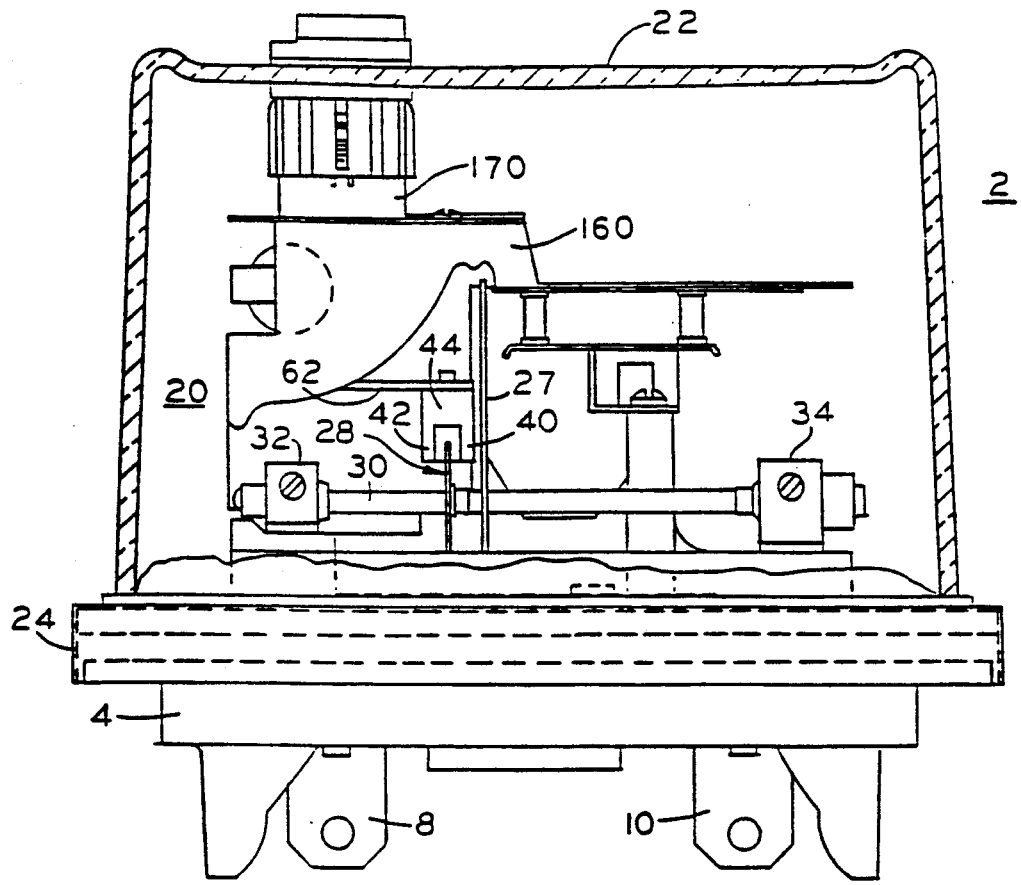
FIG_1
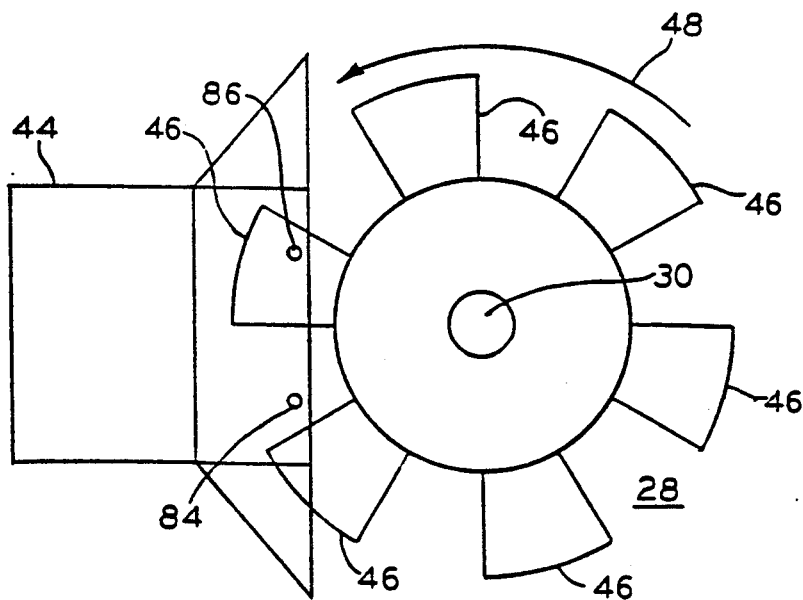
FIG_2

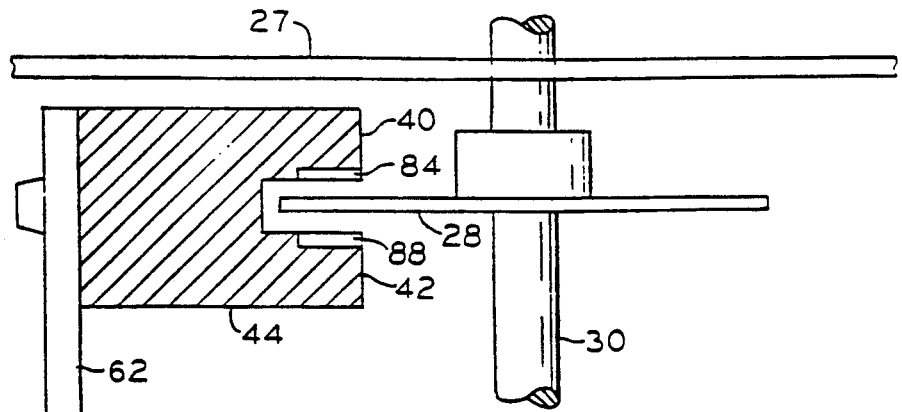
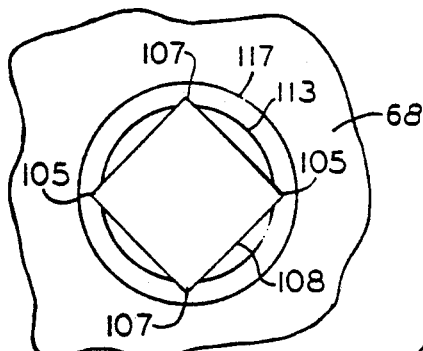
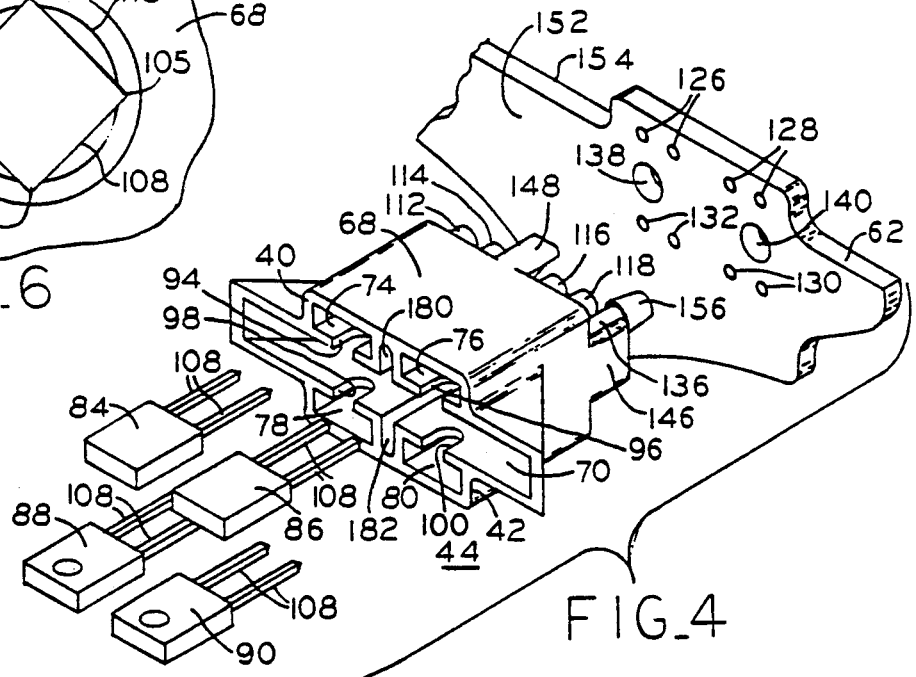
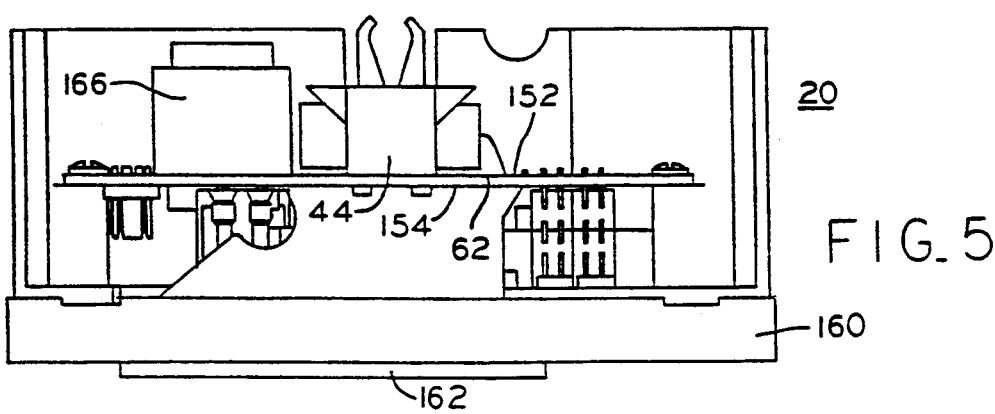

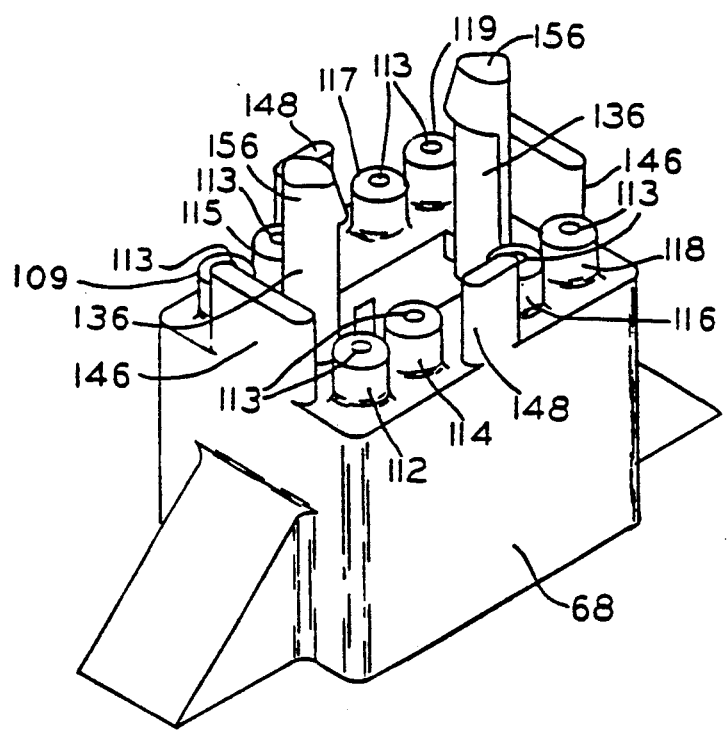
FIG_7

METHOD OF MOUNTING DISK SENSING OPTICS ONTO CIRCUIT BOARD OF WATTHOUR METER

This is a divisional of copending application(s) Ser. No. 07/505,383 filed on Apr. 5, 1990, now U.S. Pat. No. 5,034,682.

BACKGROUND OF INVENTION

The present invention relates to electric energy meters, and more particularly to a method and apparatus for mounting the disk sensing optics on the register printed circuit board of a time of use electric energy register.

The use of electronics in electric energy meters has enabled the design of energy meters with greatly increased capability and functions. However, there is increasing pressure for such meters to have fewer parts and to be substantially smaller than previous designs. Fewer parts are required in order to minimize manufacturing costs, including the cost of materials and assembly, and the subsequent cost and number of components which must be maintained for spare parts and repair purposes, along with an increase in reliability which accompanies designs which have fewer parts.

Induction watthour meters conventionally utilize the rotation of an eddy current disk in response to the power consumption on the lines being metered, which is then totalized or integrated as a measure of energy consumption, usually in Kilowatt hours. In electronic registers for use in induction watthour meters, a series of electrical pulses is used to provide an electrical signal responsive to the rate of energy consumption. This is usually achieved by mounting a toothed optical shutter on the eddy current disk shaft of the meter for rotation with the shaft, and positioning a light source and detector on opposite sides of the shutter. The toothed shutter interrupts the light path between the light source and a light detector as it rotates between them at a rate proportional to the rate of energy consumption by the load being metered. Two pairs of light emitters and detectors are typically used in such arrangements in order to detect shutter rotation direction. Typically, the light emitting and detecting pairs are housed in an assembly separate from the register and interconnected to the register by means of a cable. Directly mounting the disk sensing optics on the register printed circuit board eliminates the need for a separate circuit board and connecting cable, and in addition assists in reducing the size of the electronic register along with a reduction in other parts. However, the components of the disk sensing optics have to be accurately located relative to each other and to the optical shutter, and in addition must be shielded from external or ambient light in an energy meter including the usual transparent housing or case which may be positioned in direct sunlight or other bright light. In addition, it is desired to obtain accurate positioning, and shielding, of the disk sensing optics while at the same time avoiding any requirement for special fixturing during the manufacturing process.

OBJECTS AND SUMMARY OF INVENTION

It is an object of the present invention to minimize the components in, and size, of an electric energy meter.

It is another object of the present invention to mount the disk sensing optics on the register circuit board of an electronic time of use register, while at the same time avoiding the need for special fixturing during the manufacturing process.

It is yet another object of the present invention to provide means for accurately locating and shielding the disk sensing optics on the register circuit board of an electronic energy meter.

Still another object of the present invention is to provide an improved, yet simple, method for accurately mounting the disk sensing optics on the register printed circuit board of an electronic time of use register.

It is a further object of the present invention to simplify the assembly and maintenance of the disk sensing optics in an electronic time of use register.

In accordance with one embodiment of the present invention the disk sensing optics of an electronic time of use register in an electric energy meter is mounted on the register printed circuit board in a molded plastic housing which serves to shield the optics from ambient light and in addition accurately positions and holds the components of the disk sensing optics in place relative to the circuit board, and to each other. The assembly is designed for simple mounting to the register printed circuit board without fixturing, while providing fastening means to the printed circuit board once positioned.

More particularly, the assembly includes a molded housing defining a central chamber in which a castellated shutter rotates between 2 pairs of light emitter and detectors positioned on opposite sides of the shutter in pockets which contain apertures to guide, position and hold the light emitters and detectors. The housing further includes positioning and fastening members to position and fasten the housing to the register circuit board in such a way that the leads from the light emitters and detectors are positioned to extend through holes in the circuit board for subsequent soldering. The cross section of the round apertures in the housing is less than that across the corners of the rectangular leads of the light emitters and detectors such that when the leads are forced through the apertures they cut, and are held by, the plastic housing. The positioning and fastening means in one embodiment includes resilient jaws on one positioning member and spacers molded integral with the housing.

DRAWINGS AND BRIEF DESCRIPTION OF INVENTION

FIG. 1 is a side view of a watthour meter incorporating an electronic time of use register and incorporating one embodiment of the present invention.

FIG. 2 is a side view simplified diagram of the shutter optics utilized in the present invention.

FIG. 3 is a top view, partially in cross section, of FIG. 2.

FIG. 4 illustrates the assembly and mounting of the optics in accordance with one embodiment of the present invention.

FIG. 5 shows some of the details of the register assembly which is included within the power meter of FIG. 1.

FIG. 6 shows details of the assembly of the optical emitter and detectors shown in FIGS. 3 and 4.

FIG. 7 is a perspective view of the rear of the housing shown in FIG. 6.

Referring first to FIG. 1, an electronic or electric energy meter 2 is shown in simplified form and includes a base 4 having a plurality of circuit terminals such as 8 and 10 extending through the base to connect the meter in circuit with a power source and a load which is to be metered. An electronic register assembly 20 is positioned remote from the base 4 and meter circuit terminals 8 and 10 and the internal electronics and mechanism of the energy meter 2 is enclosed by a transparent cover or enclosure 22 which is secured to the base 4 by a locking ring 24. Optical shutter 28 is supported on a shaft 30 for rotation within bearings 32 and 34 in response to electric power supplied to, and consumed by, a load which is to be metered in circuit with the energy meter 2 and connected through circuit terminals such as 8 and 10. In a manner well known in the art, the eddy current disk 27 is caused to rotate at a speed proportional to the power provided to the load circuit to which the energy meter 2 is connected, and the watthour meter integrates the revolutions of the eddy current disk as a measure of energy consumption.

As shown somewhat schematically by FIGS. 2 and 3, the optical shutter or disk 28 also is mounted on, and rotates with, shaft 30 between spaced jaws 40 and 42 of the optical disk sensing optics assembly 44. As best shown in FIG. 3, the optical shutter 28 is castellated and includes a plurality of radially extending teeth 46 which sequentially pass between the spaced jaws 40 and 42. Positioned within the spaced jaws 40 and 42 are 2 pairs of light emitters 84 and 86 and detectors 88 and 90 which are in the path of the teeth 46 such that upon rotation of the shutter 28 in the direction shown, for example, by arrow 48, the teeth will sequentially rotate first past one light emitter and detector pair 86, 90 and then past the second light emitter and detector pair 84, 88. Thus, a light source or light emitter 84, 86 is positioned on the opposite side of the optical shutter 28 from the cooperating light detector 88, 90 respectively, such that the light transmissions from the light sources to the light detectors are twice interrupted every time a tooth 46 passes between the jaws 40 and 42.

The disk sensing optics assembly 44 of the present invention are secured to the register printed circuit board 62 which is located within the electronic register assembly 20 of the energy meter 2 as best shown in FIGS. 1 and 5.

Details of the disk sensing optics assembly 44 are best shown by FIGS. 4 and 7. Referring to FIGS. 4 and 7, the molded plastic housing 68 includes the spaced jaws 40 and 42 which are positioned on either side of the central cavity 70 through which the teeth 46 of the castellated optical shutter 28 rotate. Molded integral with the housing 68 are two pairs of rectangularly shaped pockets 74, 76, 78 and 80. The housing 68 is molded from glass-filled nylon, with 6-33% glass to provide desired stiffness. Rectangularly shaped pockets 74 and 76 are positioned side by side on one side of the central chamber 70 while a second pair of rectangularly shaped pockets 78 and 80 are positioned side by side on the opposite side of the central chamber. The rectangularly shaped pockets 74 and 78 are configured to receive, position and secure the paired light emitter 84 and light detector 88 respectively, while the rectangularly shaped pockets 76 and 80 are configured to receive, position and secure the paired light emitter 86 and light detector 90 respectively. The interior surfaces of the rectangularly shaped pockets 74, 76, 78 and 80 include centrally located radiation slots 94, 96, 98 and 100 respectively, to enable passage of the light beams between the light emitter-detector pairs 84, 88 and 86, 90. The light emitters 84 and 86 and the light detectors 88 and 90 each include a pair of electrical leads or connectors 108 which are rectangular in cross section and which extend in planes perpendicular to the axis of rotation of shaft 30. Four pairs of holes 113 in the molded housing 68 also extend from the ends of the rectangularly shaped pockets or cavities 74, 76, 78 and 80 through the cylindrical posts or columns such as 112, 114, 116 and 118, and 113, 115, 117 and 119 which extend outward from the central regions of the rectangularly shaped pockets or cavities. The holes or apertures 113 are positioned to be aligned with the electrical leads 108 or connectors 108, when the emitters 84 and 86 and detectors 88 and 90 are slid into the rectangularly shaped pockets.

As best shown in FIG. 6, the holes 113 in the housing 68 are round in cross section and slightly smaller than the cross section of the square leads 108 of the emitters 84 and 86 and detectors 88 and 90. The leads 108 are 0.020 inches square with a diagonal across alternate corners 115, 115 and 119, 119 of approximately 0.028 inches. The holes 113 are 0.026 inches in diameter with tapered or funnel shaped ends, or countersunk holes, 117 adjacent pockets 74, 76, 78 and 80. When the light emitters 84 and 86 and light detectors 89 and 90 are slid into place into the rectangularly shaped pockets 74, 76, 78 and 80 funnel ends 117 assist in guiding the leads 108 into the apertures 113. This assistance may be required if the leads 108 have been bent or misaligned by handling or during insertion of light emitters 84 and 86 and light detectors 88 and 90 into the rectangularly shaped pockets 74, 76, 78 and 80. Continued pressure on the light emitters and light detectors cause the corners 115 and 119 of leads 108 to cut into the plastic surrounding the holes in the molded plastic housing 68. This grasps the leads 108 and serves to hold the emitters 84 and 86 and detectors 88 and 90 in place during the subsequent soldering operation.

The register printed circuit board 62 includes four pairs of holes 126, 128, 130 and 132 which are 0.007-0.008 inch larger than the electrical leads 108 and are positioned for alignment with the electrical leads of the emitters 84 and 86 and detectors 88 and 90. The electrical leads 108 are long enough so that they extend through holes 113 and beyond the cylindrical posts 112, 114, 116 and 118 when the light emitters 84 and 86 and the light detectors 88 and 90 are fully positioned within the rectangularly shaped pockets 74, 76, 78 and 80.

A pair of positioning and fastening posts 136 extend between the rows of cylindrical posts such as 112, 114, 116 and 118 to mate with the positioning apertures 138 and 140 in the register printed circuit board 62 to guide the disk sensing optics assembly 44 accurately into position with the register printed circuit board. One or more resilient jaws 156 on the ends of posts 136 are compressed inwardly for insertion and then snap outward after passing through the register printed circuit board 62 to secure the disk sensing optics assembly 44 in place on the register printed circuit board FIG. 7 shows the embodiment utilizing single jaws 156 although a pair of spaced jaws on the ends of posts 136 have also proven effective. The jaws 156 are larger in cross section than the posts 136 so that after compression of the jaws inward and insertion through the apertures 138 and 140 the jaws snap outward to overlie a portion of the opposite side 154 of the register printed circuit board 62.

In a preferred embodiment of the present invention, the housing 68 of the disk sensing optics assembly 44 is first positioned on the register printed circuit board 62 and the light emitters 84 and 86 and the light detectors 88 and 90 are then individually inserted and positioned within the rectangularly shaped pockets 74, 76, 78 and 80, respectively as described above, with the electrical leads 108 being guided by the housing 68 to extend the proper predetermined distance through the holes 126, 128, 130 and 132 in the register printed circuit board. Holes 126, 128, 130 and 132 are 0.007 to 0.008 larger than the electrical leads 108 to provide space for good solder connections to the electrical runs or conductors on the register printed circuit board 62. In an alternate embodiment of the present invention, the light emitters 84 and 86 and the light detectors 88 and 90 are inserted and positioned within the rectangularly shaped pockets 74, 76, 78 and 80, respectively, before the disk sensing optics assembly 44 is positioned on the register printed circuit board 62. In this case, slightly stiffer and heavier electrical leads 108 are desirable, in the order of 0.025 inches square, and the diameter of holes 113 would also be increased, to 0.031 inches or slightly larger. The molded plastic housing 68 also includes a plurality of spacers such as 146 and 148 which extend in planes radially to the axis of rotation of shaft 30 and outward from the rear of the housing parallel to the central chamber 70, a larger distance than the cylindrical posts such as 112, 114, 116 and 118. As a result, when the disk sensing optics assembly 44 is assembled to the register printed circuit board 62 the spacers such as 146 and 148 help support and position the housing relative to the register printed circuit board, while the cylindrical posts such as 112, 114 116 and 118 are spaced from the register printed circuit board 62 to facilitate cleaning after the soldering operation.

Assembly of the disk sensing optics assembly and positioning on the register printed circuit board 62 in preparation for soldering to the register printed circuit board is thus accomplished simply and accurately without any fixturing. In the preferred embodiment, the disk sensing optics assembly 44 is brought into mating contact with the register printed circuit board 62 by simply pushing the positioning and fastening posts 136 through the positioning apertures 138 and 142. Referring to FIGS. 4, 6, and 7, the resilient jaws 156 of the positioning posts 136 are compressed together, or inwardly, as the positioning posts are forced through the positioning apertures 138 and 140 until they extend beyond the opposite surface 154 of the register printed circuit board 62. Providing a slightly larger diameter for the resilient jaws 156 at the outer ends of the positioning posts 136 provides a snap action after the positioning posts extend through the register printed circuit board 62, where the resilient jaws are free to expand and surround the edges of apertures 138 and 140 on the opposite surface 154 of the register printed circuit board. This properly positions the disk sensing optics assembly 44 on the register circuit board 62 and aligns the central holes 113 of the cylindrical posts 112-118 with the mating holes 126, 128, 130 and 132 in the register printed circuit board 62. The emitters 84 and 86 are then slid into rectangularly shaped pockets 74 and 76, and detectors 88 and 90 are slid into rectangularly shaped pockets 78 and 80. The rectangularly shaped pockets 74, 76, 78 and 80 guide the emitters and detectors 84, 86, 88 and 90 to accurately position the electrical leads 108 into contact with the holes 113 in the rear of the rectangularly shaped pockets 74, 76, 78 and 80 such that pressure on the emitters and detectors with the guidance of the funnel ends 117 force the square leads through the slightly smaller round holes, cutting into the plastic surrounding the holes in the molded plastic housing 68. This simple procedure accurately and securely positions the emitters and detectors in the housing with the ends of the electrical leads 108 extending beyond the cylindrical posts such as 112, 114, 116 and 118 and through the register printed circuit board 62 holes 126, 128, 130 and 132 a distance controlled by the spacers such as 146 and 148 contacting the adjacent surface 152 of the register printed circuit board. As a result, the electrical leads 108 extend the proper short distance beyond the opposite surface 154 of the register printed circuit board for subsequent soldering.

The disk sensing optics assembly 44 and the various optical components of the assembly have thus been securely fastened to the register printed circuit board 62 in a simple procedure which does not require any special fixturing, which minimizes parts, and which reduces the labor involved in the assembly. The simple assembly procedure properly and accurately positions light emitter 84 relative to light detector 88, light emitter 86 relative to light detector 90, and also relative to the optical shutter 28. The disk sensing optics assembly 44 and leads 108 have been properly positioned and may then be soldered in circuit with register printed circuit board 62 to provide the electrical connections to the printed circuit board. The molded plastic housing 68 is also relieved by the spacers such as 146 and 148 near the printed circuit board 62 to provide access to the electrical leads 108 entry area so that solder flex residue may be easily removed. The soldering of the leads 108 to the register printed circuit board 62 may be accomplished by flow soldering or other soldering means well known in the art. The register printed circuit board assembly is now ready to be installed in the register assembly The register assembly is best shown in FIG. 5. Referring to FIG. 5, the register assembly 20 includes an enclosure 160 which is positioned within the energy meter 2 remote from the base 4 (see FIG. 1) and includes a liquid crystal display 162, with an intermediate electronic assembly including the register printed circuit board 62 upon which is mounted the disk sensing optics assembly 44 and other electronic components such as the high voltage power supply transformer 166. The assembly and mounting of the high voltage power supply transformer 166 is disclosed in copending United States patent application Ser. No. 505,194, filed Apr. 5, 1990, now U.S. Pat. No. 5,087,875, in the name of A. A. Keturakis, R. A. Balch, and S. D. Velte, assigned to the same assignee as the present invention, and hereby incorporated by reference. The register printed circuit board 62 is mounted within the energy meter 2 such that the open end of the central chamber 70 between jaws 40 and 42 is positioned away from the liquid crystal display 162. The register printed circuit board 62 is thus interposed between the disk sensing optics assembly 44 and the ambient light outside the transparent cover 22 and optical readout or communications port 170 of the electronic energy meter 2. The details of the optical communications port are disclosed in copending United States patent application Ser. No. 505,970, filed Apr. 5, 1990, now U.S. Pat. No. 5,057,767 in the name of A. A. Keturakis and S. D. Velte, and the details of the mounting of the register printed circuit board 62 in the register enclosure 160 in proper alignment with the optical shutter 28 are disclosed in copending United States patent application Ser. No. 505,195, filed Apr. 5, 1990, now U.S. Pat. No. 5,027,056 of A. A. Keturakis, S. D. Velte, J. G. Russillo, Jr., and R. A. Balch, both of which patents are assigned to the same assignee as the present invention, and are hereby incorporated by reference.

Thus, the register disk sensing optics assembly 44 has been directly mounted on the register printed circuit board 62 without fixturing and is accurately assembled and positioned, including the positioning and assembly of the optical and electrical components within the energy meter 2 with a minimum of parts and a minimum of manufacturing time and cost. The assembly provides concurrent positioning of each of the light emitters 84 and 86 relative to the corresponding light detectors 88 and 90, and with the cooperation of funnel ends 117, positions and secures the electrical leads 108 in the holes 113, and secures the light emitters and light detectors within their respective pockets. The assembly also properly positions for soldering the leads 108 in the holes 126, 128, 130 and 132 in the register printed circuit board 62 through cooperation of the positioning and fastening posts 136 and apertures 138 and 142. In addition, the disk sensing optics assembly 44 has been adequately shielded from the ambient light passing through the transparent cover or enclosure 22 or through optical port 170 from outside the electronic energy meter. Still further, the assembly positions central aperture 70 relative to optical shutter 28.

In another embodiment of the present invention the cylindrical posts such as 112, 114, 116 and 118 (see FIG. 7) may be eliminated such that the leads 108 extend through the relief space provided by spacers such as 146 and 148. Also, two spacers, rather than two pairs of spacers 146 and 148, may be adequate, in which case they may conveniently be the spacers 146 placed on opposite ends of the molded plastic housing 68, as shown in FIG. 7. The radially extending grooves 180 and 182 (see FIG. 4) assist in the extraction and cooling of the molded plastic housing 68 from the mold while still warm. After encountering problems, it was determined that the mass of the walls in the regions between pockets 74 and 76, and in the regions between pockets 78 and 80, resulting from the cooling of the molded plastic housing 68 after removal from the mold tends to cause a sag in the housing along the outer surface of those regions in the absence of grooves 180 and 182 which allow cooling within the walls between adjacent pocket pairs. The grooves 180 and 182 allow a more even final cooling of the walls from both within and outside, preventing the deleterious sagging of the central portion of the molded housing 68 in the regions between the pockets.

Thus, while the present invention has been described through preferred embodiments, such embodiments are provided by way of example only. Numerous variations, changes and substitutions, including those discussed above will occur to those skilled in the art without departing from the scope of the present invention in the following claims.

What we claim is:

1. A method of positioning and mounting a disk sensing optics assembly on the register circuit board of an electronic register in an electric energy meter comprising the steps of:
    molding a housing including a central chamber open at one end, with one or more pockets positioned on either side of said central chamber, a plurality of positioning members extending from the closed end, and a plurality of apertures extending through the closed end;
    positioning said housing on said register circuit board by moving said positioning members into contact with cooperating positioning members on said register circuit board;
    positioning at least one light emitter in one of said pockets, and at least one light detector in at least one of said pockets on the other side of said central chamber with electrical leads extending from said at least one light emitter and said at least one light detector toward the close end of said pockets;
    moving said one or more light emitters and light detectors into position within said pockets and thereby moving the electrical leads extending from said one or more light emitters and said one or more light detectors through said plurality of apertures to extend through said closed end beyond the molded housing into holes in said register circuit board; and
    connecting said electrical leads in circuit with said register circuit board.

2. The method of positioning and mounting a disk sensing optics assembly on the register circuit board of an electric energy meter of claim 1 wherein portions of said electrical leads are larger in cross section than said apertures extending through the closed end of said housing, and inserting said electrical leads into said apertures by forcing said electrical leads into and through said apertures to extend through said apertures and retain said one or more light emitters and detectors in place in said pockets.

3. The method of positioning and mounting a disk sensing optics assembly on the register circuit board of an electric energy meter of claim 2 wherein said cross section of said electrical leads includes a plurality of surfaces at angles to each other and the cross section of said apertures are substantially circular, and said forcing said electrical leads into said apertures is with sufficient force to cause the angular portions to cut into the housing surrounding said apertures thereby gripping said electrical leads and retaining said one or more light emitters and detectors in place in said pockets.

4. The method of positioning and mounting a disk sensing optics assembly on the register circuit board of an electric energy meter of claim 3 wherein some of said positioning members extending from the closed end of said housing include spacers which contact said register circuit board when said disk sensing optics assembly is moved into position on said register circuit board, stopping the movement and positioning the disk sensing optics assembly in a predetermined position such that said electrical conductors extend into said holes in said register circuit board a predetermined amount which is suitable for soldering the ends of said electrical leads to the remote side of said register circuit board.

5. The method of positioning and mounting a disk sensing optics assembly on the register circuit board of an electric energy meter of claim 4 wherein said electrical leads are inserted through holes in said register circuit board and are soldered in circuit with circuitry on the side of said register circuit board remote from said housing.

6. The method of positioning and mounting a disk sensing optics assembly on the register circuit board of an electric energy meter of claim 1 wherein the electric energy meter includes a viewing end on one side of said register, and including the additional step of mounting said register circuit board within said electric energy meter with the open end of said central chamber facing away from the viewing end of said electric energy meter with said register circuit board positioned between said viewing end and said central chamber to shield the open end of said central chamber from ambient light at said viewing end.

7. The method of positioning and mounting a disk sensing optics assembly on the register circuit board of an electric energy meter of claim 6 wherein said register circuit board is positioned and mounted with the side of said register circuit board remote from said housing facing toward said viewing end of said electric energy meter.

8. The method of positioning and mounting a disk sensing optics assembly on the register circuit board of an electric energy meter of claim 7 including the additional step of mounting a rotatable optical shutter with a circumferential castellated portion rotatable within said central chamber and between said one or more light emitters and light detectors, such that rotation of said shutter interrupts the light beams passing between said one or more light emitters and light detectors.

9. The method of positioning and mounting a disk sensing optics assembly on the register circuit board of an electric energy meter of claim 8 including the additional step of rotating said castellated shutter in response to the electrical energy being measured by said electric energy meter.

10. The method of positioning and mounting a disk sensing optics assembly on the register circuit board of an electric energy meter of claim 8 wherein said at least one light emitter comprises two light emitters, and said at least one light detector comprise two light detectors, the light emitters and light detectors being positioned in pairs on opposite sides of said central chamber, and rotating the castellations of said shutter sequentially past said pairs of light emitters and light detectors to provide signals responsive to the direction of rotation of said shutter based on the sequence in which the light beams between the multiple pairs of light emitters and light detectors are interrupted.

11. The method of positioning and mounting a disk sensing optics assembly on the register circuit board of an electric energy meter of claim 30 wherein said plurality of positioning members extending from the closed end of said housing includes a plurality of posts through which said apertures for said electrical leads extend, and forcing said electrical leads through said apertures in said posts.

12. The method of positioning and mounting a disk sensing optics assembly on the register circuit board of an electric energy meter of claim 11 wherein said housing includes light openings in said pockets adjacent said central chamber and positioning said pairs of light emitters and detectors within said pockets such that the light beams therebetween pass through said openings.

13. A method of positioning and mounting a disk sensing optics assembly on the register circuit board of an electronic register in an electric energy meter comprising the steps of:

molding a housing including a central chamber open at one end, with one or more pockets positioned on either side of said central chamber, and a plurality of positioning members and a plurality of apertures extending through the closed end;

inserting at least one light emitter in one of said pockets and at least one light detector in at least one of said pockets on the other side of said central chamber with electrical leads extending from said at least one light emitter and at least one light detector toward the closed end of said pockets;

moving the one or more light emitters and detectors into position within said pockets and thereby moving the electrical leads extending from the one or more light emitters and detectors through said apertures in said closed end to extend beyond the molded housing;

positioning said housing on said register circuit board by moving said positioning members into contact with cooperating positioning members on said register circuit board and moving said electrical leads into holes in said register circuit board; and connecting said electrical leads in circuit with said register circuit board 14. The method of positioning and mounting a disk sensing optics assembly on the register circuit board of an electric energy meter of claim 13 wherein said closed end of said one or more pockets include a tapered opening tapering toward each of said apertures, and the inserting of said at least one light emitter and at least one light detector moving said electrical leads through said tapered shaped openings, which tapered openings guide the movement and positioning of said electrical leads into said apertures.

15. The method of positioning and mounting a disk sensing optics assembly on the register circuit board of an electric energy meter of claim 14 wherein said tapered openings are funnel shaped openings which guide the movement and positioning of said electrical leads.

16. The method of positioning and mounting a disk sensing optic assembly on the register circuit board of an electric energy meter of claim 13 wherein portions of said electrical leads are larger in cross section than said apertures in said housing, and inserting said electrical leads into said apertures by forcing said electrical leads into and through said apertures to extend through said apertures and retain said one or more light emitters and detectors in place in said pockets.

17. The method of positioning and mounting a disk sensing optics assembly on the register circuit board of an electric energy meter of claim 16 wherein said cross section of said electrical leads includes a plurality of surfaces at angles to each other and the cross section of said apertures are substantially circular, and said forcing said electrical leads into said apertures is with sufficient force to cause the angular portions to cut into the housing surrounding said apertures thereby gripping said electrical leads and retaining said one or more light emitters and detector in place in said pockets.

18. The method of positioning and mounting a disk sensing optics assembly on the register circuit board of an electric energy meter of claim 17 wherein some of said positioning members include spacers which contact said register circuit board when said disk sensing optics assembly is moved into position on said register circuit board, stopping the movement and positioning the disk sensing optics assembly in a predetermined position with said electrical conductors extending into said holes in said register circuit board a predetermined amount which is suitable for soldering to the remote side of said register circuit board without the necessity of trimming the electrical leads.

19. The method of positioning and mounting a disk sensing optics assembly on the register circuit board of an electric energy meter of claim 18 wherein said electrical leads which are inserted through holes in said register circuit board are soldered in circuit with circuitry on the side of said register circuit board remote from said housing.

20. The method of positioning and mounting a disk sensing optics assembly on the register circuit board of an electric energy meter of claim 13 wherein the electric energy meter includes a viewing end on one side of the register including the additional step of mounting said register circuit board within said electric energy meter with the open end of said central chamber facing away from the viewing end of said electric energy meter with said register circuit board between said viewing end and said central chamber to shield the open end of said central chamber from ambient light at said viewing end.

21. The method of positioning and mounting a disk sensing optics assembly on the register circuit board of an electric energy meter of claim 20 wherein said register circuit board is positioned and mounted with the side of said register circuit board remote from said housing facing toward said viewing end of said electric energy meter.

22. The method of positioning and mounting a disk sensing optics assembly on the register circuit board of an electric energy meter of claim 41 including the additional step of mounting a rotatable optical shutter with a circumferential castellated portion rotatable within said central chamber and between said one or more light emitters and light detectors, such that rotation of said shutter interrupts the light beams passing between said one or more light emitters and light detectors.

23. The method of positioning and mounting a disk sensing optics assembly on the register circuit board of an electric energy meter of claim 22 including the additional step of rotating said castellated shutter in response to the electrical energy being measured by said electric energy meter.

24. The method of positioning and mounting a disk sensing optics assembly on the register circuit board of an electric energy meter of claim 22 wherein said at least one light emitter comprises two light emitters, and said at least one light detector comprises two light detectors, the light emitters and light detectors being positioned in pairs on opposite sides of said central chamber, and rotating the castellations of said shutter sequentially past said pairs of light emitters and light detectors to provide signals responsive to the direction of rotation of said shutter based on the sequence in which the light beams between the multiple pairs of light emitters and light detectors are interrupted.

25. The method of positioning and mounting a disk sensing optics assembly on the register circuit board of an electric energy meter of claim 24 wherein said plurality of positioning members extending from the closed end of said housing includes a plurality of posts through which said apertures for said electrical leads extend, and forcing said electrical leads through the apertures in said posts.

26. The method of positioning and mounting a disk sensing optics assembly on the register circuit board of an electric energy meter of claim 25 wherein said housing includes light openings in said pockets adjacent said central chamber and positioning said pairs of light emitters and detectors within said pockets such that the light beams therebetween pass through said openings.

* * * * *